United States Patent
Honmyo et al.

(10) Patent No.: US 8,946,336 B2
(45) Date of Patent: *Feb. 3, 2015

(54) HYDROTALCITE-TYPE PARTICLES, HEAT RETAINING AGENT FOR AGRICULTURE FILMS, MASTER BATCH FOR AGRICULTURAL FILMS, AND AGRICULTURAL FILM

(75) Inventors: Kanae Honmyo, Otake (JP); Torayuki Honmyo, Otake (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 244 days.

This patent is subject to a terminal disclaimer.

(21) Appl. No.: 13/392,671

(22) PCT Filed: Aug. 26, 2010

(86) PCT No.: PCT/JP2010/064524
§ 371 (c)(1),
(2), (4) Date: Apr. 13, 2012

(87) PCT Pub. No.: WO2011/024919
PCT Pub. Date: Mar. 3, 2011

(65) Prior Publication Data
US 2012/0228539 A1     Sep. 13, 2012

(30) Foreign Application Priority Data

Aug. 26, 2009   (JP) ................. 2009-195918

(51) Int. Cl.
| | | |
|---|---|---|
| C08K 3/10 | (2006.01) | |
| C08K 3/34 | (2006.01) | |
| C08J 3/22 | (2006.01) | |
| A01G 9/14 | (2006.01) | |
| C01F 7/00 | (2006.01) | |
| C01G 9/00 | (2006.01) | |
| C09C 1/40 | (2006.01) | |

(52) U.S. Cl.
CPC ............... C08J 3/226 (2013.01); A01G 9/1438 (2013.01); C01F 7/005 (2013.01); C01G 9/006 (2013.01); C09C 1/40 (2013.01); C01P 2002/22 (2013.01); C01P 2004/54 (2013.01); C01P 2004/62 (2013.01); C01P 2006/10 (2013.01); C01P 2006/11 (2013.01); C01P 2006/12 (2013.01); C01P 2006/19 (2013.01)
USPC ............. 524/436; 524/444; 252/62; 428/402; 428/403

(58) Field of Classification Search
CPC .  C08L 23/08; C08L 23/0807; C08L 23/0815; C08K 3/08; C08K 3/10; C08K 3/22
USPC .............. 524/436, 444; 252/62; 428/402–403
See application file for complete search history.

(56) References Cited

U.S. PATENT DOCUMENTS

| | | | |
|---|---|---|---|
| 5,891,235 A * | 4/1999 | Suzuki et al. ................. 106/483 |
| 6,413,639 B1 * | 7/2002 | Kobayashi et al. ........... 428/403 |
| 6,418,661 B1 | 7/2002 | Takahashi et al. | |
| 2007/0106002 A1 | 5/2007 | Tsujimoto et al. | |
| 2012/0070573 A1 * | 3/2012 | Kobayashi et al. ........... 427/215 |

FOREIGN PATENT DOCUMENTS

| | | |
|---|---|---|
| JP | 2001-164042 | 6/2001 |
| JP | 2002-293535 | 10/2002 |
| JP | 2006-124229 | 5/2006 |
| WO | WO 2006/043352 | 4/2006 |

OTHER PUBLICATIONS

Extended European Search Report in EP 10 81 1968 dated May 9, 2014.
International Search Report for PCT/JP2010/064524, mailed Nov. 2, 2010.

* cited by examiner

Primary Examiner — Hannah Pak
(74) Attorney, Agent, or Firm — Nixon & Vanderhye P.C.

(57) ABSTRACT

The present invention relates to a heat retaining agent for agricultural films comprising hydrotalcite-type particles which can satisfy all of a transparency required for heat retaining agents for agricultural films, dispersibility in resins, and handling property at a high level. According to the present invention, there are provided hydrotalcite-type particles having an oil absorption of not more than 35 mL/100 g and a ratio of an oil absorption to a plate surface diameter (oil absorption/plate surface diameter) of 140 to 190; a heat retaining agent for agricultural films comprising the hydrotalcite-type particles; and an agricultural film comprising the heat retaining agent for agricultural films.

8 Claims, No Drawings

HYDROTALCITE-TYPE PARTICLES, HEAT RETAINING AGENT FOR AGRICULTURE FILMS, MASTER BATCH FOR AGRICULTURAL FILMS, AND AGRICULTURAL FILM

This application is the U.S. national phase of International Application No. PCT/JP2010/64524, filed 26 Aug. 2010, which designated the U.S. and claims priority to Japan Application No. 2009-195918, filed 26 Aug. 2009, the entire contents of each of which are hereby incorporated by reference.

TECHNICAL FIELD

The present invention relates to a heat retaining agent for agricultural films which is capable of exhibiting excellent heat retaining property and transparency when incorporated in the agricultural films, a master batch for agricultural films which comprises the heat retaining compound as an effective ingredient, and an agricultural film.

BACKGROUND ART

In recent years, the agricultural films produced from synthetic resins have been extensively used for green house cultivation or tunnel cultivation for field crops, etc. The agricultural films used for the above purposes are required on one hand to allow transmission of sunlight into the houses and tunnels with a high transmittance during day time, and on the other hand to absorb or reflect infrared rays emitted from plants and ground and thereby prevent the infrared rays from being released out of the houses and tunnels (i.e., have a good heat retaining property) during night time. It has been required that the heat retaining agent particles specifically used in the agricultural films are in the form of a compound comprising colorless ions having a refractive index in the vicinity of 1.45 to 1.55 as the refractive index of a resin in order to enhance transmission of sunlight through the agricultural films during day time, in the form of particles capable of exhibiting a high infrared absorption in the wavelength range of 5 to 30 μm which corresponds to an energy distribution of infrared radiation emitted from ground or plants, or in the form of fine particles having a good dispersibility so as not to cause deterioration in mechanical strength of the agricultural films when the particles are compounded therein.

To meet the above requirements of the heat retaining agents for agricultural films, there have been used hydrotalcite compounds. In order to allow the hydrotalcite compounds to exhibit an excellent transparency when added to resins, it is advantageous that the hydrotalcite compounds are in the form of particles having a small particle diameter. However, it may be difficult to uniformly disperse such particles having a small particle diameter in a master batch and a film, and there tends to arise such a problem that the particles have a poor dispersibility. In addition, as the particles become still finer, the bulk density thereof tends to be decreased, thereby causing problems such as poor handling property or poor compatibility with resins.

Conventionally, there has been proposed the method in which in order to improve a fluidity of hydrotalcite particles upon feeding the particles in a process for production of resin products, the bulk density of the hydrotalcite particles is well controlled owing to volume reduction of hydrotalcite by vacuum evacuation (Patent Document 1).

Also, there has been proposed the method in which hydrotalcite used as a heat retaining agent for agricultural films is coated with an oxysilicate compound or a phosphoric acid compound in order to impart still higher heat retaining property and transparency thereto (Patent Document 2).

PRIOR DOCUMENTS

Patent Documents

Patent Document 1: Japanese Patent Application Laid-Open (KOKAI) No. 2007-106620

Patent Document 2: Japanese Patent Application Laid-Open (KOKAI) No. 2003-231778

SUMMARY OF THE INVENTION

Problems to be Solved by the Invention

An object of the present invention is to provide a heat retaining agent for agricultural films which is free from deterioration in transparency of the agricultural films when incorporated in the films, and can exhibit a good compatibility with resins and a very high dispersibility therein, and an agricultural master batch and an agricultural film comprising the above heat retaining agent as an effective ingredient.

The conventional heat retaining agents for agricultural films are satisfactory in heat retaining property as required therefor, but tends to suffer from deterioration in transparency when incorporated in the agricultural films. In addition, when kneaded with resins to produce a high-concentration master batch, these heat retaining agents tend to have a poor compatibility with the resins, so that there tend to arise the problems such as deterioration in productivity of the master batch as well as severe deposition of the heat retaining agent, etc., on apparatuses or the like.

In the method described in Patent Document 1, hydrotalcite particles are improved in fluidity upon feeding by controlling a bulk density of the particles owing to volume reduction thereof. However, the hydrotalcite of Patent Document 1 itself is produced by conventionally known methods. Thus, the method described in Patent Document 1 does not relates to improvement in compatibility of the hydrotalcite with resins, and therefore tends to be unsatisfactory in transparency and dispersibility in resins when incorporated in films.

Also, in the method described in Patent Document 2, the surface of the respective hydrotalcite particles is coated with am oxysilicate compound or a phosphoric acid compound to impart a heat retaining property thereto. However, in Patent Document 2, the hydrotalcite itself is also produced by conventionally known methods. Thus, the hydrotalcite particles described in Patent Document 2 tend to have a high aspect ratio and may fail to realize a good fluidity, and further tend to have a poor dispersibility when incorporated in films.

An object or technical task of the present invention is to obtain hydrotalcite-based heat retaining agent particles for agricultural films which can satisfy all of a transparency required for heat retaining agents for agricultural films, dispersibility in resins, and handling property at a high level.

Means for Solving the Problems

The above object or technical task of the present invention can be achieved by the following aspects of the present invention.

That is, according to the present invention, there are provided hydrotalcite-type particles having an oil absorption of not more than 35 mL/100 g and a ratio of an oil absorption to a plate surface diameter (oil absorption/plate surface diameter) of 140 to 190 (Invention 1).

Also, according to the present invention, there are provided the hydrotalcite-type particles as described in claim 1, wherein the hydrotalcite-type particles are in the form of a compound represented by the following formula (1) (Invention 2):

$$M^{2+}{}_{1-x}Al_x(OH)_2 A^{n-}{}_p \cdot mH_2O \quad (1)$$

wherein $M^{2+}$ is at least one metal element selected from the group consisting of Mg and Zn; $A^{n-}$ is an n-valent anion wherein n represents a valence of the anion; and x is a number of 0.2 to 0.5 (0.2≤x≤0.5), m is a number of 0 to 1 (0≤m≤1), and p is x/n.

Also, according to the present invention, there are provided the hydrotalcite-type particles as described in the above Invention 1 or 2, wherein the hydrotalcite-type particles have an apparent density $\rho_a$ of not less than 0.25 g/cc (Invention 3).

Also, according to the present invention, there are provided the hydrotalcite-type particles as described in any one of the above Inventions 1 to 3, wherein the hydrotalcite-type particles have a tap density $\rho_t$ of not less than 0.55 g/cc (Invention 4).

Also, according to the present invention, there are provided the hydrotalcite-type particles as described in any one of the above Inventions 1 to 4, wherein the hydrotalcite-type particles have a plate surface diameter of not more than 0.25 μm, a BET specific surface area of not more than 30 m²/g and an aspect ratio of not more than 2.5 (Invention 5).

Also, according to the present invention, there are provided the hydrotalcite-type particles as described in any one of the above Inventions 1 to 5, wherein a part or whole of an intercalated water is removed from the hydrotalcite-type particles (Invention 6).

In addition, according to the present invention, there is provided a heat retaining agent for agricultural films comprising the hydrotalcite-type particles as described in any one of the above Inventions 1 to 6 (Invention 7).

Further, according to the present invention, there is provided a master batch for agricultural films comprising the heat retaining agent for agricultural films as described in the above Invention 7, and an olefin-based resin in which the heat retaining agent is incorporated (Invention 8).

Furthermore, according to the present invention, there is provided an agricultural film comprising the heat retaining agent for agricultural films as described in the above Invention 7 (Invention 9).

Effects of the Invention

The heat retaining agent for agricultural films which comprises the hydrotalcite-type particles according to the present invention can satisfy both of a transparency and a dispersibility in resins at a high level upon formation of the films.

PREFERRED EMBODIMENTS FOR CARRYING OUT THE INVENTION

The construction of the present invention is described in more detail below.

First, the hydrotalcite-type particles according to the present invention are described. The hydrotalcite-type particles according to the present invention are in the form of a compound represented by the following formula (1).

$$M^{2+}{}_{1-x}Al_x(OH)_2 A^{n-}{}_p \cdot mH_2O \quad (1)$$

In the formula (1), $M^{2+}$ represents at least one metal element selected from the group consisting of Mg and Zn; and $A^{n-}$ represents an n-valent anion wherein n represents a valence of the anion.

The exponents x, m and p are as follows.
0.2≤x≤0.5
0≤m≤1
p=x/n

Examples of the anion ($A^{n-}$) contained in the hydrotalcite-type particles according to the present invention include a hydroxyl ion (OH), a carbonate ion ($CO_3^{2-}$) and a sulfate ion ($SO_4^{2-}$). Among these anions, especially preferred is a carbonate ion. In addition, oxyacid anions such as phosphorus-based oxyacid anions, silicon-based oxyacid anions and boron-based oxyacid anions may also be used because these anions are expected to exhibit the effect of enhancing an infrared absorbing property of the hydrotalcite-type particles.

The oil absorption of the hydrotalcite-type particles according to the present invention is not more than 35 mL/100 g, and preferably 25 to 33 mL/100 g. When the oil absorption of the hydrotalcite-type particles is more than 35 mL/100 g, the compatibility of the hydrotalcite-type particles with resins tends to become deteriorated when added thereto, so that the hydrotalcite-type particles may fail to be sufficiently dispersed in the resins. The oil absorption of the hydrotalcite-type particles may be used as a scale or measure upon determining whether or not the hydrotalcite-type particles are kept in an agglomerated state, i.e., are in the form of secondary particles. When the hydrotalcite-type particles are agglomerated and formed into secondary particles, oil may be absorbed into a gap between the resulting agglomerated particles. Therefore, it is meant that as the oil absorption of the hydrotalcite-type particles becomes increased, the secondary particles of the hydrotalcite-type particles are formed in a larger amount, namely, the hydrotalcite-type particles tend to be more easily agglomerated together owing to a poor dispersibility thereof.

It may be determined that the compatibility of the heat retaining agent particles with resins becomes higher as the torque difference as measured by the method described in Examples below is reduced. The value of the torque difference is preferably not more than 0.21 kg·m. In addition, the dispersibility of the hydrotalcite-type particles is preferably controlled such that an average value of the number of aggregates of non-dispersed particles as measured by the method described in Examples below is not more than 4 (i.e., evaluation rating: ○ or Δ).

The hydrotalcite-type particles according to the present invention have a ratio of an oil absorption to a plate surface diameter (oil absorption/plate surface diameter) of 140 to 190. Meanwhile, although the ratio of oil absorption (mL/g)/plate surface diameter (μm) has a unit of (mL/g/μm=m²/g), the ratio value is expressed with omission of the unit in the present invention. When the ratio of oil absorption/plate surface diameter is less than 140, the plate surface diameter of the particles is large relative to the oil absorption thereof, so that the resulting film tends to be deteriorated in transparency. On the other hand, when the ratio of oil absorption/plate surface diameter is more than 190, the compatibility of the particles with resins tends to become deteriorated, which tends to result in deterioration in a dispersibility of the particles in the resins and a productivity of the film. The ratio of oil absorption/plate surface diameter is preferably 142 to 188 and more preferably 145 to 185.

The hydrotalcite-type particles according to the present invention have a plate shape. The plate surface diameter of the hydrotalcite-type particles is preferably not more than 0.25 μm, more preferably 0.1 to 0.25 μm and still more preferably 0.1 to 0.2 μm. When the plate surface diameter of the hydrotalcite-type particles is less than 0.1 μm, the particles tend to be insufficient in dispersibility when kneaded in resins. On the contrary, when the plate surface diameter of the hydrotalcite-type particles is more than 0.25 μm, even though the particles are uniformly dispersed in the resins, the resulting material tends to be deteriorated in transparency.

The apparent density ($\rho_a$) of the hydrotalcite-type particles according to the present invention is preferably not less than 0.25 g/cc. When the apparent density ($\rho_a$) of the hydrotalcite-type particles is less than 0.25 g/cc, the resulting particles tend to be deteriorated in fluidity. The apparent density ($\rho_a$) of the hydrotalcite-type particles is more preferably not less than 0.3 g/cc.

The tap density ($\rho_t$) of the hydrotalcite-type particles according to the present invention is preferably not less than 0.55 g/cc. When the tap density ($\rho_t$) of the hydrotalcite-type particles is less than 0.55 g/cc, the resulting particles tend to be deteriorated in fluidity. The tap density ($\rho_t$) of the hydrotalcite-type particles is more preferably not less than 0.6 g/cc.

The BET specific surface area of the hydrotalcite-type particles according to the present invention is preferably not more than 30 $m^2/g$ and more preferably not more than 20 $m^2/g$. When the BET specific surface area of the hydrotalcite-type particles is more than 30 $m^2/g$, the resulting particles tend to become fine particles and therefore tend to be agglomerated together, which tends to result in deteriorated dispersibility of the particles. The lower limit of the BET specific surface area of the hydrotalcite-type particles is about 5 $m^2/g$.

The aspect ratio of the hydrotalcite-type particles according to the present invention is preferably not more than 2.5. The particles having an aspect ratio of not more than 2.5 have an isotropic particle shape and therefore exhibit a high bulk density and an enhanced fluidity. The aspect ratio of the hydrotalcite-type particles is more preferably 1.0 to 2.4.

Next, the process for producing the hydrotalcite-type particles according to the present invention is described.

The hydrotalcite-type particles according to the present invention may be produced by conducting the following process. That is, the process includes a first reaction step in which an anion-containing alkali aqueous solution, a magnesium salt aqueous solution and an aluminum salt aqueous solution are mixed with each other, and then the obtained mixed aqueous solution is aged at a pH value of 9 to 12 in a temperature range of 80 to 100° C. for 2 to 8 hr to thereby produce an intermediate product 1 in the form of Mg—Al-based hydrotalcite-type particles; a second reaction step in which a magnesium salt aqueous solution and an aluminum salt aqueous solution which comprise magnesium and aluminum in such an amount that a ratio of a total molar number of the magnesium and aluminum to a total molar number of magnesium and aluminum added upon production of the intermediate product 1 lies within the range of 0.25 to 0.5 are added to an aqueous suspension of the intermediate product 1, and then the obtained mixture is aged at a pH value of 9 to 12 in a temperature range of 80 to 100° C. for 1 to 3 hr to thereby produce an intermediate product 2 in the form of Mg—Al-based hydrotalcite-type particles; and a hydrothermal reaction step in which an aqueous suspension comprising the intermediate product 2 is transferred to a hydrothermal reaction vessel and aged therein at a pH value of 9 to 12 in a temperature range of 120 to 160° C. for 2 to 9 hr to form treated particles, and then the treated particles are subjected to surface treatment to thereby produce hydrotalcite-type particles capable of satisfying the requirements concerning the above oil absorption and ratio of oil absorption/plate surface diameter.

In addition, if required, by further adding a zinc salt aqueous solution in the first reaction step and/or the second reaction step in the above production process, it is also possible to obtain Mg—Zn—Al-based hydrotalcite-type particles comprising a desired amount of zinc.

The anion-containing alkali aqueous solution used in the present invention is preferably a mixed alkali aqueous solution prepared from an anion-containing aqueous solution and an alkali hydroxide aqueous solution.

The anion-containing aqueous solution is preferably a sodium carbonate aqueous solution.

The alkali hydroxide aqueous solution is preferably a sodium hydroxide aqueous solution.

In the present invention, as the magnesium salt aqueous solution, there may be used a magnesium sulfate aqueous solution, a magnesium chloride aqueous solution and a magnesium nitrate aqueous solution. Among these magnesium salt aqueous solutions, preferred are a magnesium sulfate aqueous solution and a magnesium chloride aqueous solution.

In the present invention, as the zinc salt aqueous solution, there may be used a zinc sulfate aqueous solution, a zinc chloride aqueous solution and a zinc nitrate aqueous solution. Among these zinc salt aqueous solutions, preferred are a zinc sulfate aqueous solution and a zinc chloride aqueous solution.

In the present invention, as the aluminum salt aqueous solution, there may be used an aluminum sulfate aqueous solution, an aluminum chloride aqueous solution and an aluminum nitrate aqueous solution. Among these zinc salt aqueous solutions, preferred are an aluminum sulfate aqueous solution and an aluminum chloride aqueous solution.

The order of adding or mixing of the anion-containing alkali aqueous solution, magnesium salt aqueous solution and aluminum salt aqueous solution is not particularly limited. The respective aqueous solutions may be added and mixed with each other at the same time. It is preferred that a mixed aqueous solution prepared by previously mixing the magnesium salt aqueous solution with the aluminum salt aqueous solution be added to the anion-containing alkali aqueous solution.

The respective aqueous solutions may be either added at one time, or added continuously in a dropwise manner.

The concentrations of the respective salts in the reaction solution obtained by mixing the anion-containing alkali aqueous solution, magnesium salt aqueous solution and aluminum salt aqueous solution with each other in the first reaction step are as follows. That is, the concentration of the magnesium salt in the reaction solution is preferably 0.1 to 1.5 mol/L and more preferably 0.5 to 1.2 mol/L; the concentration of the aluminum salt in the reaction solution is preferably 0.1 to 1.0 mol/L and more preferably 0.2 to 0.8 mol/L; the concentration of the anion in the reaction solution is preferably 0.1 to 1.5 mol/L and more preferably 0.2 to 1.2 mol/L; and the concentration of the alkali hydroxide aqueous solution in the reaction solution is preferably 0.5 to 8 mol/L and more preferably 1 to 6 mol/L. The molar ratio of magnesium to aluminum added (Mg/Al) is preferably 0.8 to 5.0 and more preferably 0.9 to 4.5.

In the first reaction step, the aging reaction is conducted at a temperature of 80 to 100° C. and preferably 85 to 100° C. When the aging reaction temperature is less than 80° C., although the hydrotalcite-type particles are produced, the resulting particles tend to be fine particles, so that it is not possible to obtain the intermediate product 1 having a plate surface diameter suitable for kneading with resins.

During the ageing reaction in the first reaction step, the pH value of the reaction solution is adjusted to 9 to 12 and preferably 9.5 to 11.5. When the pH value is less than 9, it is not possible to obtain the intermediate product 1 having an adequate thickness. On the other hand, when the pH value is more than 12, the plate surface diameter of the resulting particles tends to be increased, so that it is not possible to obtain the particles having an isotropic particle shape.

The aging reaction time in the first reaction step is preferably 2 to 8 hr. When the aging reaction time is less than 2 hr, the intermediate product 1 having a large plate surface diameter and an adequate thickness tends to be hardly obtained. On the other hand, when the aging reaction time is more than 8 hr, such an aging reaction may be disadvantageous from the economical viewpoint.

At the time of completion of the first reaction step, no magnesium nor aluminum remains in the reaction suspension, and a whole amount of the magnesium and aluminum added is used for production of the intermediate product 1. Therefore, it is suggested that the composition of the intermediate product 1 is the same as the composition of the respective components charged.

The intermediate product 1 produced in the first reaction step has a plate surface diameter of preferably 0.04 to 0.20 μm and more preferably 0.10 to 0.20 μm, a thickness of preferably 0.01 to 0.07 μm and more preferably 0.01 to 0.05 μm, an aspect ratio of preferably not more than 4, and a BET specific surface area of preferably 8 to 70 $m^2/g$.

The ratio of the total molar number of the magnesium and aluminum added in the second reaction step to the total molar number of the magnesium and aluminum added in the first reaction step is 0.25 to 0.5 and preferably 0.3 to 0.4. On the premise that the reaction is conducted at a concentration capable of industrially obtaining an aimed product with a certain yield, when the ratio of the total molar number of the magnesium and aluminum added in the second reaction step to the total molar number of the magnesium and aluminum added in the first reaction step is less than 0.25, the slurry obtained in the first reaction step tends to have an excessively high viscosity and therefore tends to be hardly sufficiently stirred, so that it is not possible to obtain particles having a uniform particle size distribution. On the other hand, when the ratio of the total molar number of the magnesium and aluminum added in the second reaction step to the total molar number of the magnesium and aluminum added in the first reaction step is more than 0.5, a large amount of fine particles tend to be deposited, so that it is not possible to obtain particles having a uniform particle size distribution.

The order of addition of the magnesium salt aqueous solution and aluminum salt aqueous solution used in the second reaction step is not particularly limited. The respective aqueous solutions may be added at the same time. It is preferred that a mixed aqueous solution prepared by previously mixing the magnesium salt aqueous solution and aluminum salt aqueous solution with each other be added to the reaction system.

In addition, in the second reaction step, when adding the mixed aqueous solution prepared by previously mixing the magnesium salt aqueous solution and aluminum salt aqueous solution with each other, the resulting mixed aqueous solution is preferably gradually added rather than being added at one time. If the mixed aqueous solution is added at one time, a large amount of fine particles tend to be deposited, so that it may be difficult to obtain particles having a uniform particle size distribution.

The concentrations of the respective salts in the reaction solution prepared by mixing the magnesium salt aqueous solution and aluminum salt aqueous solution with each other in the second reaction step are as follows. The concentration of the magnesium salt in the reaction solution is preferably 0.2 to 1.5 mol/L and more preferably 0.5 to 1.3 mol/L. The concentration of the aluminum salt in the reaction solution is preferably 0.1 to 1 mol/L and more preferably 0.15 to 0.5 mol/L. The molar ratio of magnesium to aluminum added (Mg/Al) is preferably 0.8 to 5.0 and more preferably 0.9 to 4.5.

In the second reaction step, the aging reaction is conducted at a temperature of 80 to 100° C. and preferably 85 to 100° C. When the aging reaction temperature is less than 80° C., although the hydrotalcite-type particles are produced, the resulting particles tend to become fine particles, so that it is not possible to obtain the intermediate product 2 having a plate surface diameter suitable for kneading with resins.

During the ageing reaction in the second reaction step, the pH value of the reaction solution is 9 to 12 and preferably 9.5 to 11.5. When the pH value is less than 9, it is not possible to obtain the intermediate product 2 having an adequate thickness. On the other hand, when the pH value is more than 12, the plate surface diameter of the resulting particles tends to be increased, so that it is not possible to obtain the particles having an isotropic particle shape.

The aging reaction time in the second reaction step is preferably 1 to 3 hr. When the aging reaction time is less than 1 hr, the intermediate product 2 having a large plate surface diameter and an adequate thickness tends to be hardly obtained. On the other hand, when the aging reaction time is more than 3 hr, such an aging reaction may be disadvantageous from the economical viewpoint.

At the time of completion of the second reaction step, no magnesium nor aluminum remains in the reaction suspension, and a whole amount of the magnesium and aluminum added is used for production of the intermediate product 2. Therefore, it is suggested that the composition of a hydrotalcite layer formed on a surface the intermediate product 1 obtained in the first reaction step is the same as the composition of the respective components charged in the second reaction step.

The intermediate product 2 produced in the second reaction step has a plate surface diameter of preferably 0.06 to 0.20 μm and more preferably 0.10 to 0.20 μm, a thickness of preferably 0.01 to 0.07 μm and more preferably 0.02 to 0.06 μm, an aspect ratio of preferably not more than 3, and a BET specific surface area of preferably 8 to 70 $m^2/g$.

In the hydrothermal reaction step, the aging reaction is conducted at a temperature of 120 to 160° C. and preferably 130 to 160° C. When the aging reaction temperature in the hydrothermal reaction step is less than 120° C., although the hydrotalcite-type particles are produced, it is not possible to obtain the hydrotalcite-type treated particles having a plate surface diameter suitable for kneading with resins, an adequate thickness and an isotropic particle shape.

During the ageing reaction in the hydrothermal reaction step, the pH value of the reaction solution is adjusted to 9 to 12 and preferably 9.5 to 11.5. When the pH value is less than 9, it is not possible to obtain the hydrotalcite-type treated particles having a large plate surface diameter, an adequate thickness and an isotropic particle shape.

The aging reaction time in the hydrothermal reaction step is preferably 2 to 9 hr. When the aging reaction time is less than 2 hr, the hydrotalcite-type treated particles having a large plate surface diameter, an adequate thickness and an isotropic particle shape tend to be hardly obtained. On the other hand, when the aging reaction time is more than 9 hr, such an aging reaction may be disadvantageous from the economical viewpoint.

At the time of completion of the hydrothermal reaction step, no magnesium nor aluminum remains in the reaction suspension, and therefore no elution of the magnesium and aluminum from the intermediate product 2 obtained in the second reaction step is caused.

The hydrotalcite-type treated particles produced in the hydrothermal reaction step preferably has a plate surface diameter of not more than 0.25 μm, a thickness of 0.03 to 0.10 μm, an aspect ratio of not more than 2.5, and a BET specific surface area of 8 to 50 m²/g.

After completion of the hydrothermal reaction step, the resulting particles are washed with water and dried by ordinary methods, thereby obtaining treated particles of the hydrotalcite-type particles.

The thus obtained treated particles are preferably subjected to lipophilic surface treatment in order to improve a dispersibility thereof in resins. Examples of a surface-treating agent used in the lipophilic surface treatment include higher fatty acids, organic silane compounds and rosins. The surface of the respective particles may be coated with the surface-treating agent by any of a dry surface treatment and a wet surface treatment.

In the case of the wet surface treatment with higher fatty acids, or organic silane compounds, rosins and the like, an aqueous solution in which any of the above surface-treating agents is completely dissolved is added to the aqueous suspension prepared by dispersing the hydrotalcite-type treated particles in water, and mixed and stirred therewith while adjusting a temperature of the resulting mixed solution to 20 to 90° C., or further while suitably adjusting a pH value thereof after the mixing and stirring, if required, whereby the surface of the respective hydrotalcite-type treated particles is coated with higher fatty acids, or organic silane compounds, rosins and the like, and then the resulting coated particles are subjected to filtration, water-washing and pulverization.

In the case of the dry surface treatment with higher fatty acids, or organic silane compounds, rosins and the like, the hydrotalcite-type treated particles are charged into a Henschel mixer, a sand mill, an edge runner, a Taninaka-type crusher, an attritor, etc., and then any of the above surface-treating agents is added thereto to subject the obtained mixture to dry mixing.

Examples of the higher fatty acids used in the wet surface treatment include behenic acid, behenic acid, stearic acid, palmitic acid, myristic acid, lauric acid, 12-hydroxystearic acid, sodium stearate, sodium lauryl benzenesulfonate and sodium oleate. Examples of the higher fatty acids used in the dry surface treatment include behenic acid, behenic acid, stearic acid, palmitic acid, myristic acid, lauric acid, 12-hydroxystearic acid and oleic acid.

The coating amount of the higher fatty acids among the surface-coating materials used for the hydrotalcite-type particles according to the present invention is preferably 0.2 to 20.0% by weight and more preferably 0.5 to 18.0% by weight in terms of C based on the weight of the hydrotalcite-type particles. When the coating amount of the higher fatty acids is less than 0.2% by weight, the effect of coating the particles with the higher fatty acids tends to be hardly obtained. When the coating amount of the higher fatty acids is more than 20.0% by weight, the effect of coating the particles with the higher fatty acids tends to be already saturated, and therefore the use of such a more than necessary amount of the higher fatty acids is meaningless.

Examples of the organic silane compounds include decyl trimethoxysilane, γ-aminopropyl triethoxysilane and γ-aminopropyl trimethoxysilane. These organic silane compounds may be used in both of the wet and dry surface treatments. Among these organic silane compounds, preferred are decyl trimethoxysilane and γ-aminopropyl triethoxysilane.

The coating amount of the organic silane compounds among the surface-coating materials used for the hydrotalcite-type particles according to the present invention is preferably 0.2 to 18.0% by weight and more preferably 0.4 to 16.5% by weight in terms of C based on the weight of the hydrotalcite-type particles. When the coating amount of the organic silane compounds is less than 0.2% by weight, the effect of coating the particles with the organic silane compounds tends to be hardly obtained. When the coating amount of the organic silane compounds is more than 18.0% by weight, the effect of coating the particles with the organic silane compounds tends to be already saturated, and therefore the use of such a more than necessary amount of the organic silane compounds is meaningless.

Examples of the rosins used in the wet surface treatment include water-soluble rosins. Examples of the rosins used in the dry surface treatment include natural rosins and hydrogenated rosins.

The coating amount of the rosins among the surface-coating materials used for the hydrotalcite-type particles according to the present invention is preferably 0.2 to 25.0% by weight and more preferably 0.5 to 20.0% by weight in terms of C based on the weight of the hydrotalcite-type particles. When the coating amount of the rosins is less than 0.2% by weight, the effect of coating the particles with the rosins tends to be hardly obtained. When the coating amount of the rosins is more than 25.0% by weight, the effect of coating the particles with the rosins tends to be already saturated, and therefore the use of such a more than necessary amount of the rosins is meaningless.

The surface treatment may be carried out by one stage or two stages. In the two-stage treatment, it is preferred that the wet surface treatment is first conducted and then the dry surface treatment is conducted.

In addition, the hydrotalcite-type particles according to the present invention can exhibit the effect as a heat retaining agent without any change even after removing a part or whole of an intercalated water therefrom. The removal of a part or whole of an intercalated water from the hydrotalcite-type particles rather leads to suppression of foaming when kneaded with resins as well as increase in productivity. In the hydrotalcite-type particles from which a part or whole of an intercalated water is removed, the exponent m in the above formula (1) is preferably in the range of 0 to 0.6.

Next, the master batch for agricultural films according to the present invention is described.

As the resins used in the master batch for agricultural films according to the present invention, there may be used polymers or copolymers of olefins such as ethylene, propylene, butene-1 and vinyl acetate. Examples of the resins include polyethylenes such as low-density polyethylene and linear low-density polyethylene, polypropylene, ethylene-propylene copolymers, ethylene-butene-1 copolymers, ethylene-vinyl acetate copolymers and ethylene-α-olefin copolymers. Among these resins, polyethylenes, ethylene-α-olefin copolymers and ethylene-vinyl acetate copolymers having a vinyl acetate content of not more than 25% by weight are preferred in view of a transparency, a weather resistance and a low price.

Meanwhile, the composition of the resins used in the master batch may be either the same as or different from that of diluting resins used upon production of the agricultural film according to the present invention. When using the resins having a different composition from that of the diluting resins, the kinds of resins used may be determined in view of properties capable of attaining a good compatibility between these resins.

The content of the hydrotalcite-type particles in the master batch for agricultural films according to the present invention is preferably 10 to 250 parts by weight and more preferably 20 to 220 parts by weight based on 100 parts by weight of the resins. When the content of the hydrotalcite-type particles in the master batch is less than 10 parts by weight, the resulting material tends to be insufficient in melt viscosity when kneaded with the resins, so that the heat retaining agent tends to be hardly dispersed and mixed therein. When the content of the hydrotalcite-type particles is more than 250 parts by weight, the content of the resins in the master batch tends to be insufficient, so that it may be difficult to well disperse and mix the heat retaining agent therein.

The master batch for agricultural films according to the present invention may be produced by a method of mixing the resins and the heat retaining agent in a mixing device such as a ribbon blender, a Nauter mixer, a Henschel mixer and a super mixer and then kneading and molding the resulting mixture using a known single-screw kneading extruder or twin-screw kneading extruder, etc., followed by cutting the resulting kneaded and molded material, or a method of kneading the above mixture using a Banbury mixer, a pressure kneader, etc., and then subjecting the resulting kneaded material to pulverization or molding and cutting.

When producing pellets of the master batch for agricultural films according to the present invention, various known additives such as a lubricant, a light stabilizer, an antioxidant, an anti-blocking agent, an antistatic agent, an ultraviolet absorber, an anti-fogging agent, a defogging agent, a pigment, a dye and a thermal stabilizer may be appropriately added thereto, if required.

The pellets of the master batch for agricultural films according to the present invention have an average major axis diameter of preferably 1 to 6 mm and more preferably 2 to 5 mm and an average minor axis diameter of preferably 2 to 5 mm and more preferably 2.5 to 4 mm. When the average major axis diameter is less than 1 mm, the workability upon production of the pellets tends to be undesirably lowered. When the average major axis diameter is more than 6 mm, the difference in size of the pellets from that of the diluting resins tends to be excessively large, so that it may be difficult to sufficiently disperse and mix the pellets in the resins. The pellets may have various shapes, and may be formed into an amorphous shape, a granular shape such as a spherical shape, a cylindrical shape, a flake shape, etc.

Next, the agricultural film according to the present invention is described.

As the resins used in the agricultural film according to the present invention, there may be used polymers or copolymers of olefins such as ethylene, propylene, butene-1 and vinyl acetate. Examples of the resins include polyethylenes such as low-density polyethylene and linear low-density polyethylene, polypropylene, ethylene-propylene copolymers, ethylene-butene-1 copolymers, ethylene-vinyl acetate copolymers and ethylene-α-olefin copolymers. Among these resins, polyethylenes, ethylene-α-olefin copolymers and ethylene-vinyl acetate copolymers having a vinyl acetate content of not more than 25% by weight are preferred in view of a transparency, a weather resistance and a low price.

When producing the agricultural film according to the present invention, various known additives such as a lubricant, a light stabilizer, an antioxidant, an anti-blocking agent, an antistatic agent, an ultraviolet absorber, an anti-fogging agent, a defogging agent, a pigment, a dye and a thermal stabilizer may be appropriately added thereto, if required.

The agricultural film according to the present invention may have a laminated structure, if required.

The content of the hydrotalcite-type particles in the agricultural film according to the present invention is preferably 1 to 30 parts by weight and more preferably 2 to 25 parts by weight based on 100 parts by weight of the resins. When the content of the hydrotalcite-type particles in the agricultural film is less than 1 part by weight, the resulting agricultural film tends to be insufficient in the effect of improving a heat retaining property. When the content of the hydrotalcite-type particles in the agricultural film is more than 30 parts by weight, the resulting agricultural film tends to be deteriorated in transparency.

The heat retaining property of the agricultural film according to the present invention may be controlled such that the heat retaining index as measured by the bellow-mentioned evaluation method is preferably not less than 70% and more preferably not less than 80%.

The transparency of the agricultural film according to the present invention may be evaluated by the haze value as measured by the bellow-mentioned evaluation method. The haze value is preferably not more than 6.0% and more preferably not more than 5.0%.

Next, the process for producing the agricultural film according to the present invention is described.

The agricultural film according to the present invention may be produced by charging the hydrotalcite-type particles according to the present invention together with the resins into a mixing device such as, for example, a ribbon blender, a Nauter mixer, a Banbury mixer, a super mixer and a Henschel mixer by an ordinary method and mixing them with each other therein, and then melting and kneading the resulting mixture using an extruder, a Banbury mixer, a pressure kneader, etc., followed by forming the resulting kneaded material into a film shape by various methods such as an inflation method and a T-die method.

In addition, in the present invention, the above agricultural film may be produced from the master batch pellets which are previously prepared by mixing the above resins with a desired amount of the hydrotalcite-type particles.

<Function>

The important point of the present invention resides in the following production process. That is, the production process includes the first reaction step in which hydrotalcite-type particles as the intermediate product 1 are produced by a co-precipitation reaction; the second reaction step in which a magnesium salt aqueous solution and an aluminum salt aqueous solution are added to an aqueous suspension comprising the intermediate product 1, and the resulting mixture is aged to obtain hydrotalcite-type particles as the intermediate product 2 having an adequate thickness relative to a plate surface diameter thereof and an isotropic particle shape under normal pressures; and further the hydrothermal reaction step in which the hydrotalcite-type particles are grown into those having a particle size suitable for being dispersed in resins while keeping the isotropic particle shape.

The reason why the hydrotalcite-type particles having an isotropic particle shape can be obtained is considered by the present inventors as follows. That is, it is considered to be effective that by maintaining the reaction system of the first reaction step at a pH value of not more than 12, the intermediate product 1 produced therein can be prevented from suffering from rapid growth of a plate surface thereof so that the plate surface diameter and the thickness of the resulting particles can exhibit an isotropic balance. In addition, it is important that even in the case where the hydrotalcite layer formed by co-precipitation of magnesium ions and aluminum ions added in the second reaction step is epitaxially grown and coated on the surface of the intermediate product 1 produced in the first reaction step, by controlling a pH value of the reaction system to not more than 12, the particle growth is allowed to proceed while maintaining the isotropic particle shape of the intermediate product 1 produced in the first reaction step. Similarly, it is considered that by controlling a pH value of the reaction system of the hydrothermal reaction step to not more than 12, the particles can be grown into those having a particle size suitable for kneading with the resins while suppressing the growth in the plate surface direction and maintaining the isotropic particle shape.

EXAMPLES

Next, the present invention is described in more detail by the following Examples. However, the following Examples are only illustrative and not intended to limit the present invention thereto.

Various properties of the hydrotalcite-type particles and agricultural film according to the present invention were evaluated by the following methods.

The constitutional phase of the hydrotalcite-type particles was identified using a powder X-ray diffractometer "RINT-2500" manufactured by RIGAKU Co., Ltd. The measurement was carried out under the following conditions: diffraction angle 2θ: 3 to 80°; step angle: 0.03°; FTO: 0.3 sec. Cu was used as a radiation source.

The exponent x in the compositional formula of $M^{2+}_{1-x}Al_x(OH)_2A^{n-}_p \cdot mH_2O$ of the hydrotalcite-type particles was determined as follows. That is, the hydrotalcite-type particles were dissolved in an acid and analyzed by a plasma emission spectrophotometer "iCAP6500" manufactured by Thermo Electron Co., Ltd., using yttrium as an internal standard.

The oil absorption of the hydrotalcite-type particles was determined according to JIS K5101-13-2 as follows. That is, an amount of boiled linseed oil absorbed in 2.5 g of the hydrotalcite-type particles was measured, and the oil absorption was expressed in terms of the amount per 100 g of the particles.

The plate surface diameter of the hydrotalcite-type particles was expressed by an average value of particle diameters measured on a transmission electron micrograph of the particles. The transmission electron microscope used was "JEM-1200EX II" manufactured by JEOL Ltd. The hydrotalcite-type particles were dispersed in water or an alcohol, and the resulting solution was attached on a mesh and dried to prepare a sample to be observed. Among the particles in the thus prepared sample, those particles (200 particles) which were attached to the mesh such that a plate surface thereof was oriented in the horizontal direction relative to the mesh were selected to measure a plate surface diameter of the respective particles, and an average value of the measured plate surface diameters was determined as a plate surface diameter of the hydrotalcite-type particles.

The thickness of the hydrotalcite-type particles was expressed by an average value of thicknesses measured on a transmission electron micrograph of the particles similarly to the plate surface diameter thereof. Among the particles in the prepared sample, those particles (100 particles) which were attached to the mesh such that a plate surface thereof was oriented in the vertical direction relative to the mesh were selected to measure a thickness of the respective particles, and an average value of the measured thicknesses was determined as a thickness of the hydrotalcite-type particles. The aspect ratio of the hydrotalcite-type particles was calculated from a ratio of the plate surface diameter to the thickness (plate surface diameter/thickness).

As to the density of the particles, an apparent density ($\rho_a$) and a tap density ($\rho_t$) thereof were measured. The measurement was conducted by the method according to JIS Z2504: 2000 and JIS Z2512: 2006.

The specific surface area of the particles was measured by B.E.T. method using a measuring device "Monosorb MS-21" manufactured by QUANTA CHROM Corp.

The hydrotalcite-type heat retaining agent particles were mixed with a resin using a twin-screw kneader such that the concentration of the particles in the resulting mixture was 40%, thereby producing a master batch. The kneading was conducted using "Labo-Plasto-Mill" manufactured by Toyo Seiki Seisakusho Co., Ltd., under the following conditions: preheating time: 10 min; kneading temperature: 120° C.; rotating speed: 120 rpm; kneading time: 15 min.

The compatibility of the heat retaining agent particles with a resin was determined as follows. That is, the heat retaining agent particles and the resin were kneaded together using "Labo-Plasto-Mill" to measure torque values as required. The difference between a maximum torque required at the initial kneading stage and a stable torque obtained after the elapse of 5 min from initiation of the kneading was calculated as an index of the compatibility. The smaller the difference value, the more excellent the compatibility of the particles with the resin becomes.

The master batch comprising the heat retaining agent in an amount of 40% was subjected to pressure molding process using a hot press, thereby obtaining a pressed film having a thickness of 100 μm. The pressing conditions were as follows: pressing temperature: 160° C.; pressing pressure: 150 kgf/cm$^2$; pressing time: 1 min; amount treated: 0.8 g. The thus prepared film was measured for a haze value thereof (degree of cloudiness) using a haze meter.

The heat retaining property was evaluated by a heat retaining index. The infrared absorption spectrum of the above agricultural film was measured using a Fourier transform infrared spectrophotometer "FTIR-8700" manufactured by Shimadzu Seisakusho Corp., in the range of 2,000 to 400 cm$^{-1}$ at intervals of 1 cm$^{-1}$, and the measured values were corrected based on a film thickness of 100 μm to obtain a correction absorptivity at the respective wave numbers. The thus obtained correction absorptivity was multiplied by a relative black body radiation energy at 15° C. at the respective wave numbers to thereby calculate a relative black body radiation energy absorptivity. The thus calculated relative black body radiation energy absorptivity values were integrated, and the thus obtained integrated value was divided by a total relative black body radiation energy in the range of 2,000 to 400 cm$^{-1}$ to thereby obtain the heat retaining index.

The dispersibility of the particles in the resin was evaluated as follows. That is, the above pressed film having a thickness of 100 μm was cut into a sample of 5 cm square. The surface of the thus obtained sample was marked with grids at intervals of 1 cm, and observed using an optical microscope. The dispersibility was evaluated by average value of the numbers of aggregates of non-dispersed particles being present in one grid of 1 cm square.

◯: Not more than 1;

Δ: 2 to 4; and

X: Not less than 5.

Example 1

Two hundred milliliters of a sodium carbonate aqueous solution having a concentration of 3.17 mol/L in terms of $CO_3^{2-}$ ions, 300 mL of a 9.57 mol/L sodium hydroxide aqueous solution and 400 mL of water were mixed with each other to prepare a mixed solution having a total volume of 900 mL. The thus obtained solution was held in a reaction container at 60° C. while stirring. To the solution was added a mixed solution comprising 350 mL of a magnesium sulfate aqueous solution having a concentration of 2.07 mol/L in terms of $Mg^{2+}$ ions and 50 mL of an aluminum sulfate aqueous solution having a concentration of 3 mol/L in terms of $Al^{3+}$ ions, and further 100 mL of water were added to the resulting solution to prepare a mixed solution having a total volume of 1.4 L. After completion of the addition, the obtained solution was heated and aged at a pH value of 10.7 at 95° C. for 5 hr, thereby producing a slurry comprising a white precipitate. The thus obtained intermediate product 1 had a plate surface diameter of 0.08 μm and a specific surface area of 45.5 $m^2/g$ (first reaction step).

Next, a mixed solution comprising 150 mL of a magnesium sulfate aqueous solution having a concentration of 1.94 mol/L in terms of $Mg^{2+}$ ions, 20 mL of an aluminum sulfate aqueous solution having a concentration of 3 mol/L in terms of $Al^{3+}$ ions and 130 mL of water was gradually added into the above slurry over 30 min. After completion of the addition, the resulting solution was further aged at a pH value of 9.4 at 95° C. for 1 hr, thereby producing a slurry comprising a white precipitate. The thus obtained intermediate product 2 had a plate surface diameter of 0.10 μm and a specific surface area of 38.1 $m^2/g$ (second reaction step). The ratio of the total molar number of magnesium and aluminum added in the second reaction step to the total molar number of magnesium and aluminum added in the first reaction step was 0.4.

The thus obtained slurry was transferred into an autoclave reaction container and aged at a pH value of 9.8 at 145° C. for 5 hr, thereby producing a slurry comprising a white precipitate (hydrothermal reaction step). The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type treated particles had a plate surface diameter of 0.20 μm, a thickness of 0.09 μm and a specific surface area of 15.3 $m^2/g$ (solid content: 65.3 g/L) as well as a molar ratio of Mg to Al of 2.4.

Into 300 mL of warm water were added and completely dissolved 3.8 g of sodium stearate. Then, 1.53 L of the slurry withdrawn from the autoclave reaction container were transferred into a separate reaction container and held therein at 65° C. while stirring, and the above prepared sodium stearate aqueous solution was added to the slurry, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.04 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 32 mL/100 g, a specific surface area of 11 $m^2/g$, an aspect ratio of 2.2, an apparent density ($\rho_a$) of 0.34 g/cc and a tap density ($\rho_t$) of 0.64 g/cc as well as a ratio of an oil absorption to a particle diameter (oil absorption/particle diameter) of 160.

The above obtained hydrotalcite-type particles were mixed with a polyethylene resin "CX2001" produced by Sumitomo Chemical Co., Ltd., using a twin-screw kneader such that the concentration of the hydrotalcite-type particles in the resulting mixture was 40%, thereby obtaining a master batch. The difference between a maximum torque in an initial stage of the kneading and a stable torque after the elapse of 5 min was 0.17 kg·m.

The thus obtained master batch was subjected to pressure molding treatment using a hot press, thereby obtaining a pressed film having a thickness of 100 μm. The thus obtained film had a haze value (degree of cloudiness) of 5.3 and a heat retaining index of 93.4. Meanwhile, the haze value of the blank film was 0.5. In addition, the dispersibility of the particles in the resin was evaluated to be the Rank ○.

Example 2

One hundred grams of the hydrotalcite-type particles surface-treated with stearic acid which were obtained in Example 1 were charged together with 1 g of stearic acid into a Taninaka-type crusher, and pulverized and mixed therein for 5 min, thereby obtaining hydrotalcite-type particles coated with stearic acid.

The thus obtained hydrotalcite-type particles had an oil absorption of 31 mL/100 g, a specific surface area of 11 $m^2/g$, an aspect ratio of 2.2, an apparent density ($\rho_a$) of 0.32 g/cc and a tap density ($\rho_t$) of 0.62 g/cc as well as a ratio of an oil absorption to a particle diameter (oil absorption/particle diameter) of 155. Further, with respect to the above hydrotalcite-type particles, the torque difference as measured upon kneading with the polyethylene resin was 0.15 kg·m, and the resulting film had a haze of 5.4, a heat retaining index of 93.3 and a dispersibility with the Rank of ○.

Example 3

One hundred grams of the hydrotalcite-type particles surface-treated with stearic acid which were obtained in Example 1 were charged together with 1.5 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 28 mL/100 g, a specific surface area of 11 $m^2/g$, an aspect ratio of 2.2, an apparent density ($\rho_a$) of 0.34 g/cc and a tap density ($\rho_t$) of 0.62 g/cc as well as a ratio of an oil absorption to a particle diameter (oil absorption/particle diameter) of 140. Further, with respect to the above hydrotalcite-type particles, the torque difference as measured upon kneading with the polyethylene resin was 0.09 kg·m, and the resulting film had a haze of 5.3, a heat retaining index of 93.5 and a dispersibility with the Rank of ○.

Example 4

The hydrothermal reaction step was conducted in the same manner as defined in Example 1 except that the slurry was aged at a pH value of 9.6 at 140° C. for 4 hr, thereby producing a slurry comprising a white precipitate. The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type treated particles had a plate surface diameter of 0.18 μm, a thickness of 0.08 μm and a specific surface area of 17.4 $m^2/g$ (solid content: 65.3 g/L) as well as a molar ratio of Mg to Al of 2.4.

Into 300 mL of warm water were added and completely dissolved 4.30 g of sodium stearate. Then, 1.53 L of the slurry withdrawn from the autoclave reaction container were transferred into a separate reaction container and held therein at 65° C. while stirring. The above prepared sodium stearate aqueous solution was added to the slurry, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.04 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 33 mL/100 g, a specific surface area of 14 m$^2$/g, an aspect ratio of 2.3, an apparent density ($\rho_a$) of 0.31 g/cc and a tap density ($\rho_t$) of 0.62 g/cc as well as a ratio of an oil absorption to a particle diameter (oil absorption/particle diameter) of 183. Further, with respect to the above hydrotalcite-type particles, the torque difference as measured upon kneading with the resin was 0.08 kg·m, and the resulting film had a haze of 5.5, a heat retaining index of 93.5 and a dispersibility with the Rank of ○.

Example 5

The slurry obtained after the hydrothermal reaction step of Example 1 was filtered and washed with water to obtain hydrotalcite-type treated particles. The thus obtained hydrotalcite-type treated particles were placed in an electric furnace controlled to 260° C. for 2 hr to remove a whole amount of an intercalated water therefrom. One hundred grams of the hydrotalcite-type particles from which the intercalated water was removed were charged together with 3.5 g of stearic acid into a Taninaka-type crusher, and pulverized and mixed therein for 5 min, thereby obtaining dehydrated hydrotalcite-type particles coated with stearic acid.

The thus obtained hydrotalcite-type particles had an oil absorption of 34 mL/100 g, a specific surface area of 11 m$^2$/g, an aspect ratio of 2.5, an apparent density ($\rho_a$) of 0.32 g/cc and a tap density ($\rho_t$) of 0.60 g/cc as well as a ratio of an oil absorption to a particle diameter (oil absorption/particle diameter) of 140. Further, with respect to the above hydrotalcite-type particles, the torque difference as measured upon kneading with the polyethylene resin was 0.19 kg·m, and the resulting film had a haze of 5.6, a heat retaining index of 95.4 and a dispersibility with the Rank of Δ.

Example 6

Two hundred milliliters of a sodium carbonate aqueous solution having a concentration of 2.82 mol/L in terms of $CO_3^{2-}$ ions, 300 mL of a 9.28 mol/L sodium hydroxide aqueous solution and 400 mL of water were mixed with each other to prepare a mixed solution having a total volume of 900 mL. The thus obtained solution was held in a reaction container at 60° C. while stirring. To the solution was added a mixed solution comprising 350 mL of a magnesium sulfate aqueous solution having a concentration of 2.07 mol/L in terms of $Mg^{2+}$ ions and 50 mL of an aluminum sulfate aqueous solution having a concentration of 2.68 mol/L in terms of $Al^{3+}$ ions, and further 100 mL of water were added to the resulting solution to prepare a mixed solution having a total volume of 1.4 L. After completion of the addition, the obtained solution was heated and aged at a pH value of 10.5 at 95° C. for 3.5 hr, thereby producing a slurry comprising a white precipitate. The thus obtained intermediate product 1 had a plate surface diameter of 0.10 μm and a specific surface area of 37.3 m$^2$/g (first reaction step).

Next, a mixed solution comprising 150 mL of a magnesium sulfate aqueous solution having a concentration of 1.93 mol/L in terms of $Mg^{2+}$ ions, 20 mL of an aluminum sulfate aqueous solution having a concentration of 2.7 mol/L in terms of $Al^{3+}$ ions and 130 mL of water was gradually added into the above slurry over 30 min. After completion of the addition, the resulting solution was further aged at a pH value of 9.7 at 95° C. for 1 hr, thereby producing a slurry comprising a white precipitate. The thus obtained intermediate product 2 had a plate surface diameter of 0.12 μm and a specific surface area of 34.1 m$^2$/g (second reaction step). The ratio of the total molar number of magnesium and aluminum added in the second reaction step to the total molar number of magnesium and aluminum added in the first reaction step was 0.4.

The thus obtained slurry was transferred into an autoclave reaction container and aged at a pH value of 9.8 at 140° C. for 5 hr, thereby producing a slurry comprising a white precipitate (hydrothermal reaction step). The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type treated particles had a plate surface diameter of 0.20 μm, a thickness of 0.09 μm and a specific surface area of 14.9 m$^2$/g (solid content: 62.5 g/L) as well as a molar ratio of Mg to Al of 2.7.

Into 300 mL of warm water were added and completely dissolved 3.8 g of sodium stearate. Then, 1.6 L of the slurry withdrawn from the autoclave reaction container were transferred into a separate reaction container and held therein at 65° C. while stirring, and the above prepared sodium stearate aqueous solution was added to the slurry, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.04 g of lauric acid into a Henschel mixer, and pulverized and mixed therein for 5 min, thereby obtaining hydrotalcite-type particles coated with lauric acid.

The thus obtained hydrotalcite-type particles had an oil absorption of 32 mL/100 g, a specific surface area of 11 m$^2$/g, an aspect ratio of 2.2, an apparent density ($\rho_a$) of 0.34 g/cc and a tap density ($\rho_t$) of 0.64 g/cc as well as a ratio of an oil absorption to a particle diameter (oil absorption/particle diameter) of 160. The torque difference as measured upon kneading with a polyethylene resin was 0.17 kg·m, and the resulting film had a haze of 4.3, a heat retaining index of 94.0 and a dispersibility with the Rank ○.

Example 7

Two hundred milliliters of a sodium carbonate aqueous solution having a concentration of 3.01 mol/L in terms of $CO_3^{2-}$ ions, 300 mL of a 11.2 mol/L sodium hydroxide aqueous solution and 400 mL of water were mixed with each other to prepare a mixed solution having a total volume of 900 mL. The thus obtained solution was held in a reaction container at 60° C. while stirring. To the solution was added a mixed solution comprising 350 mL of a magnesium sulfate aqueous solution having a concentration of 2.46 mol/L in terms of $Mg^{2+}$ ions and 50 mL of an aluminum sulfate aqueous solution having a concentration of 2.9 mol/L in terms of $Al^{3+}$ ions, and further 100 mL of water were added to the resulting solution to prepare a mixed solution having a total volume of 1.4 L. After completion of the addition, the obtained solution was heated and aged at a pH value of 10.7 at 95° C. for 3 hr, thereby producing a slurry comprising a white precipitate. The thus obtained intermediate product 1 had a plate surface diameter of 0.10 μm and a specific surface area of 37.2 m$^2$/g (first reaction step).

Next, a mixed solution comprising 150 mL of a magnesium sulfate aqueous solution having a concentration of 2.29 mol/L in terms of Mg$^{2+}$ ions, 20 mL of an aluminum sulfate aqueous solution having a concentration of 2.9 mol/L in terms of Al$^{3+}$ ions and 130 mL of water was gradually added into the above slurry over 30 min. After completion of the addition, the resulting solution was further aged at a pH value of 10.2 at 95° C. for 1 hr, thereby producing a slurry comprising a white precipitate. The thus obtained intermediate product 2 had a plate surface diameter of 0.12 μm and a specific surface area of 34.7 m$^2$/g (second reaction step). The ratio of the total molar number of magnesium and aluminum added in the second reaction step to the total molar number of magnesium and aluminum added in the first reaction step was 0.4.

The thus obtained slurry was transferred into an autoclave reaction container and aged at a pH value of 10.7 at 135° C. for 5 hr, thereby producing a slurry comprising a white precipitate. The thus obtained white precipitate was filtered out, washed with water and then dried at 120° C., thereby obtaining white particles (hydrothermal reaction step). As a result of the analysis for identifying the white particles, it was confirmed that the white particles were hydrotalcite-type particles. The thus obtained hydrotalcite-type treated particles had a plate surface diameter of 0.19 μm, a thickness of 0.09 μm and a specific surface area of 15.9 m$^2$/g (solid content: 71.4 g/L) as well as a molar ratio of Mg to Al of 3.

Into 300 mL of warm water were added and completely dissolved 3.8 g of sodium stearate. Then, 1.4 L of the slurry withdrawn from the autoclave reaction container were transferred into a separate reaction container and held therein at 65° C. while stirring, and the above prepared sodium stearate aqueous solution was added to the slurry, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.04 g of lauric acid into a Henschel mixer, and pulverized and mixed therein for 5 min, thereby obtaining hydrotalcite-type particles coated with lauric acid.

The thus obtained hydrotalcite-type particles had an oil absorption of 32 mL/100 g, a specific surface area of 11 m$^2$/g, an aspect ratio of 2.2, an apparent density ($\rho_a$) of 0.34 g/cc and a tap density ($\rho_t$) of 0.64 g/cc as well as a ratio of an oil absorption to a particle diameter (oil absorption/particle diameter) of 160. The torque difference as measured upon kneading with a polyethylene resin was 0.17 kg·m, and the resulting film had a haze of 3.7, a heat retaining index of 94.3 and a dispersibility with the Rank ○.

Example 8

Two hundred milliliters of a sodium carbonate aqueous solution having a concentration of 3.62 mol/L in terms of $CO_3^{2-}$ ions, 300 mL of a 10.1 mol/L sodium hydroxide aqueous solution and 400 mL of water were mixed with each other to prepare a mixed solution having a total volume of 900 mL. The thus obtained solution was held in a reaction container at 60° C. while stirring. To the solution was added a mixed solution comprising 350 mL of a magnesium sulfate aqueous solution having a concentration of 2.07 mol/L in terms of Mg$^{2+}$ ions and 50 mL of an aluminum sulfate aqueous solution having a concentration of 3.45 mol/L in terms of Al$^{3+}$ ions, and further 100 mL of water were added to the resulting solution to prepare a mixed solution having a total volume of 1.4 L. After completion of the addition, the obtained solution was heated and aged at a pH value of 10.7 at 95° C. for 5 hr, thereby producing a slurry comprising a white precipitate. The thus obtained intermediate product 1 had a plate surface diameter of 0.10 μm and a specific surface area of 36.9 m$^2$/g (first reaction step).

Next, a mixed solution comprising 150 mL of a magnesium sulfate aqueous solution having a concentration of 1.935 mol/L in terms of Mg$^{2+}$ ions, 20 mL of an aluminum sulfate aqueous solution having a concentration of 3.5 mol/L in terms of Al$^{3+}$ ions and 130 mL of water was gradually added into the above slurry over 30 min. After completion of the addition, the resulting solution was further aged at a pH value of 9.4 at 95° C. for 1 hr, thereby producing a slurry comprising a white precipitate. The thus obtained intermediate product 2 had a plate surface diameter of 0.12 μm and a specific surface area of 34.3 m$^2$/g (second reaction step). The ratio of the total molar number of magnesium and aluminum added in the second reaction step to the total molar number of magnesium and aluminum added in the first reaction step was 0.4.

The thus obtained slurry was transferred into an autoclave reaction container and aged at a pH value of 9.8 at 145° C. for 5 hr, thereby producing a slurry comprising a white precipitate (hydrothermal reaction step). The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type treated particles had a plate surface diameter of 0.20 μm, a thickness of 0.1 μm and a specific surface area of 15.1 m$^2$/g (solid content: 68.3 g/L) as well as a molar ratio of Mg to Al of 2.1.

Into 300 mL of warm water were added and completely dissolved 3.8 g of sodium stearate. Then, 1.46 L of the slurry withdrawn from the autoclave reaction container were transferred into a separate reaction container and held therein at 65° C. while stirring, and the above prepared sodium stearate aqueous solution was added to the slurry, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.04 g of lauric acid into a Henschel mixer, and pulverized and mixed therein for 5 min, thereby obtaining hydrotalcite-type particles coated with lauric acid.

The thus obtained hydrotalcite-type particles had an oil absorption of 32 mL/100 g, a specific surface area of 11 m$^2$/g, an aspect ratio of 2.2, an apparent density ($\rho_a$) of 0.34 g/cc and a tap density ($\rho_t$) of 0.64 g/cc as well as a ratio of an oil absorption to a particle diameter (oil absorption/particle diameter) of 160. The torque difference as measured upon kneading with a polyethylene resin was 0.17 kg·m, and the resulting film had a haze of 5.9, a heat retaining index of 93.0 and a dispersibility with the Rank ○.

Example 9

The hydrotalcite-type particles coated with lauric acid which were obtained in Example 1 were mixed with an EVA resin "PES-400" (VA content: 15%) produced by Nippon Unicar Co., Ltd., using a twin-screw kneader such that the concentration of the particles in the resulting mixture was 40%, thereby producing a master batch. The difference between a maximum torque in an initial stage of the kneading and a stable torque after the elapse of 5 min was 0.16 kg·m. The resulting film had a haze of 8.6, a heat retaining index of 96.8 and a dispersibility with the Rank ○. Meanwhile, the haze value of the blank film was 0.9.

Example 10

Into 300 mL of water were added 10 mL of a 1.5 mol/L sodium hydroxide solution, followed by heating the resulting solution to 60° C. Then, 2.5 g of lauric acid were added into the obtained solution and completely dissolved therein while stirring. Next, 1.53 L of the slurry obtained after the hydrothermal reaction step in Example 1 were transferred into a separate reaction container and held therein at 65° C. while stirring, and the above prepared lauric acid aqueous solution was added to the slurry, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with lauric acid. The thus obtained hydrotalcite-type particles were charged together with 1.03 g of stearic acid into a Taninaka-type crusher, and pulverized and mixed therein for 5 min, thereby obtaining hydrotalcite-type particles coated with stearic acid.

The thus obtained hydrotalcite-type particles had an oil absorption of 35 mL/100 g, a specific surface area of 11 m$^2$/g, an aspect ratio of 2.2, an apparent density ($\rho_a$) of 0.33 g/cc and a tap density ($\rho_t$) of 0.63 g/cc as well as a ratio of an oil absorption to a particle diameter (oil absorption/particle diameter) of 175. The torque difference as measured upon kneading with a polyethylene resin was 0.21 kg·m, and the resulting film had a haze of 5.6, a heat retaining index of 93.4 and a dispersibility with the Rank Δ.

Example 11

Into 300 mL of water were added 10 mL of a 1.5 mol/L sodium hydroxide solution, followed by heating the resulting solution to 60° C. Then, 3.7 g of 12-hydroxystearic acid were added into the obtained solution and completely dissolved therein while stirring. Next, 1.53 L of the slurry obtained after the hydrothermal reaction step in Example 1 were transferred into a separate reaction container and held therein at 65° C. while stirring, and the above prepared 12-hydroxystearic acid aqueous solution was added to the slurry, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with 12-hydroxystearic acid. The thus obtained hydrotalcite-type particles were charged together with 1.04 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 34 mL/100 g, a specific surface area of 11 m$^2$/g, an aspect ratio of 2.2, an apparent density ($\rho_a$) of 0.32 g/cc and a tap density ($\rho_t$) of 0.63 g/cc as well as a ratio of an oil absorption to a particle diameter (oil absorption/particle diameter) of 170. The torque difference as measured upon kneading with a polyethylene resin was 0.2 kg·m, and the resulting film had a haze of 5.7, a heat retaining index of 93.3 and a dispersibility with the Rank Δ.

Example 12

One hundred grams of the hydrotalcite-type particles surface-treated with stearic acid which were obtained in Example 1 were charged together with 1 g of 12-hydroxystearic acid into a Taninaka-type crusher, and pulverized and mixed therein for 5 min, thereby obtaining hydrotalcite-type particles coated with stearic acid.

The thus obtained hydrotalcite-type particles had an oil absorption of 34 mL/100 g, a specific surface area of 11 m$^2$/g, an aspect ratio of 2.2, an apparent density ($\rho_a$) of 0.33 g/cc and a tap density ($\rho_t$) of 0.64 g/cc as well as a ratio of an oil absorption to a particle diameter (oil absorption/particle diameter) of 170. The torque difference as measured upon kneading with a polyethylene resin was 0.18 kg·m, and the resulting film had a haze of 5.3, a heat retaining index of 93.3 and a dispersibility with the Rank ○.

Comparative Example 1

Two hundred milliliters of a sodium carbonate aqueous solution having a concentration of 3.17 mol/L in terms of $CO_3^{2-}$ ions, 450 mL of a 10 mol/L sodium hydroxide aqueous solution and 250 mL of water were mixed with each other to prepare a mixed solution having a total volume of 900 mL. The thus obtained solution was held in a reaction container at 60° C. while stirring. To the solution was added a mixed solution comprising 350 mL of a magnesium sulfate aqueous solution having a concentration of 2.07 mol/L in terms of $Mg^{2+}$ ions and 50 mL of an aluminum sulfate aqueous solution having a concentration of 3 mol/L in terms of $Al^{3+}$ ions, and further 100 mL of water were added to the resulting solution to prepare a mixed solution having a total volume of 1.4 L. After completion of the addition, the obtained solution was heated and aged at a pH value of 12.5 at 65° C. for 5 hr, thereby producing a slurry comprising a white precipitate. The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type treated particles had a plate surface diameter of 0.045 μm and a specific surface area of 60 m$^2$/g (solid content: 65.3 g/L) as well as a molar ratio of Mg to Al of 2.4.

While maintaining 1.53 L of the thus obtained slurry at 65° C. under stirring, an aqueous solution prepared by completely dissolving 15.2 g of sodium stearate in 1 L of warm water was added thereto, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.28 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 48 mL/100 g, a specific surface area of 60 m$^2$/g, an aspect ratio of 2.5, an apparent density ($\rho_a$) of 0.15 g/cc and a tap density ($\rho_t$) of 0.29 g/cc as well as a ratio of an oil absorption to a particle diameter (oil absorption/particle diameter) of 1067. The torque difference as measured upon kneading with a polyethylene resin was 0.30 kg·m, and the resulting film had a haze of 9.8, a heat retaining index of 92.9 and a dispersibility with the Rank X.

Comparative Example 2

The first reaction step was conducted in the same manner as defined in Example 1 except that the reaction time was changed to 3.5 hr, and the subsequent second reaction step was conducted in the same manner as defined in Example 1, thereby producing a slurry comprising a white precipitate. The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type treated particles had a plate surface diameter of 0.07 μm and a specific surface area of 39 $m^2/g$ (solid content: 65.3 g/L) as well as a molar ratio of Mg to Al of 2.4.

While maintaining 1.53 L of the thus obtained slurry at 65° C. under stirring, an aqueous solution prepared by completely dissolving 9.4 g of sodium stearate in 1 L of warm water was added thereto, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.09 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 44 mL/100 g, a specific surface area of 37 $m^2/g$, an aspect ratio of 2.7, an apparent density ($\rho_a$) of 0.17 g/cc and a tap density ($\rho_t$) of 0.32 g/cc as well as a ratio of an oil absorption to a particle diameter (oil absorption/particle diameter) of 629. The torque difference as measured upon kneading with a polyethylene resin was 0.28 kg·m, and the resulting film had a haze of 9.5, a heat retaining index of 93.0 and a dispersibility with the Rank X.

Comparative Example 3

Two hundred milliliters of a sodium carbonate aqueous solution having a concentration of 3.17 mol/L in terms of $CO_3^{2-}$ ions, 300 mL of a 9.57 mol/L sodium hydroxide aqueous solution and 400 mL of water were mixed with each other to prepare a mixed solution having a total volume of 900 mL. The thus obtained solution was held in a reaction container at 30° C. while stirring. To the solution was added a mixed solution comprising 500 mL of a magnesium sulfate aqueous solution having a concentration of 2.03 mol/L in terms of $Mg^{2+}$ ions and 200 mL of an aluminum sulfate aqueous solution having a concentration of 1.06 mol/L in terms of $Al^{3+}$ ions, and further 100 mL of water were added to the resulting solution to prepare a mixed solution having a total volume of 1.7 L. The resulting slurry was transferred into an autoclave reaction container, and aged therein at pH value of 10.0 at 140° C. for 3 hr, thereby obtaining a slurry comprising a white precipitate. The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type particles had a plate surface diameter of 0.26 μm, a thickness of 0.05 μm and a specific surface area of 17.3 $m^2/g$ (solid content: 65.3 g/L) as well as a molar ratio of Mg to Al of 2.4.

While maintaining 1.53 L of the thus obtained slurry at 65° C. under stirring, an aqueous solution prepared by completely dissolving 4.4 g of sodium stearate in 300 mL of warm water was added thereto, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.04 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 36 mL/100 g, a specific surface area of 15 $m^2/g$, an aspect ratio of 5.2, an apparent density ($\rho_a$) of 0.23 g/cc and a tap density ($\rho_t$) of 0.52 g/cc as well as a ratio of an oil absorption to a particle diameter (oil absorption/particle diameter) of 138. The torque difference as measured upon kneading with a polyethylene resin was 0.23 kg·m, and the resulting film had a haze of 8.7, a heat retaining index of 93.3 and a dispersibility with the Rank Δ.

Comparative Example 4

The hydrothermal reaction step was conducted in the same manner as defined in Example 1 except that the reaction was conducted at a pH value of 10.0 at 160° C. for 6 hr, thereby producing a slurry comprising a white precipitate. The thus obtained white precipitate was filtered out, washed with water and then dried at 120° C., thereby obtaining white particles. As a result of the analysis for identifying the white particles, it was confirmed that the white particles were hydrotalcite-type particles. The thus obtained hydrotalcite-type particles had a plate surface diameter of 0.24 μm, a thickness of 0.084 μm and a specific surface area of 13.2 $m^2/g$ (solid content: 65.3 g/L) as well as a molar ratio of Mg to Al of 2.4.

While maintaining 1.53 L of the thus obtained slurry at 65° C. under stirring, an aqueous solution prepared by completely dissolving 3.3 g of sodium stearate in 300 mL of warm water was added thereto, and the resulting liquid mixture was maintained for 20 min to subject the hydrotalcite-type particles to surface treatment. The resulting slurry was filtered, washed with water and then dried at 120° C., thereby obtaining hydrotalcite-type particles surface-treated with stearic acid. The thus obtained hydrotalcite-type particles were charged together with 1.03 g of lauric acid into a Taninaka-type crusher, and pulverized and mixed therein for 5 min, thereby obtaining hydrotalcite-type particles coated with lauric acid.

The thus obtained hydrotalcite-type particles had an oil absorption of 39 mL/100 g, a specific surface area of 9 $m^2/g$, an aspect ratio of 2.9, an apparent density ($\rho_a$) of 0.21 g/cc and a tap density ($\rho_t$) of 0.49 g/cc as well as a ratio of an oil absorption to a particle diameter (oil absorption/particle diameter) of 163. The torque difference as measured upon kneading with a polyethylene resin was 0.25 kg·m, and the resulting film had a haze of 8.8, a heat retaining index of 93.2 and a dispersibility with the Rank Δ.

Comparative Example 5

"DHT-4A" produced by Kyowa Chemical Industry Co., Ltd., was used as particles of Comparative Example 5.

Comparative Example 6

"HT-P" produced by Sakai Chemical Industry Co., Ltd., was used as particles of Comparative Example 6.

Production conditions of the above Examples and Comparative Examples are shown in Table 1, and various properties of the resulting hydrotalcite-type particles are shown in Table 2.

TABLE 1

| Examples and Comparative Examples | Synthesis of particles First reaction step | | |
|---|---|---|---|
| | Temperature (° C.) | Time (hr) | pH |
| Example 1 | 95 | 5 | 10.7/95° C. |
| Example 2 | 95 | 5 | 10.7/95° C. |
| Example 3 | 95 | 5 | 10.7/95° C. |
| Example 4 | 95 | 5 | 10.7/95° C. |
| Example 5 | 95 | 5 | 10.7/95° C. |
| Example 6 | 95 | 3.5 | 10.5/95° C. |
| Example 7 | 95 | 3 | 10.7/95° C. |
| Example 8 | 95 | 5 | 10.7/95° C. |
| Example 9 | 95 | 5 | 10.7/95° C. |
| Example 10 | 95 | 5 | 10.7/95° C. |
| Example 11 | 95 | 5 | 10.7/95° C. |
| Example 12 | 95 | 5 | 10.7/95° C. |
| Comparative Example 1 | 65 | 3.5 | 12.5/65° C. |
| Comparative Example 2 | 95 | 3.5 | 10.7/95° C. |
| Comparative Example 3 | — | — | — |
| Comparative Example 4 | 95 | 5 | 11.0/95° C. |

| Examples and Comparative Examples | Synthesis of particles Second reaction step | | |
|---|---|---|---|
| | Temperature (° C.) | Time (hr) | pH |
| Example 1 | 95 | 1 | 9.4/95° C. |
| Example 2 | 95 | 1 | 9.4/95° C. |
| Example 3 | 95 | 1 | 9.4/95° C. |
| Example 4 | 95 | 1 | 9.4/95° C. |
| Example 5 | 95 | 1 | 9.4/95° C. |
| Example 6 | 95 | 1 | 9.7/95° C. |
| Example 7 | 95 | 1 | 10.2/95° C. |
| Example 8 | 95 | 1 | 9.4/95° C. |
| Example 9 | 95 | 1 | 9.4/95° C. |
| Example 10 | 95 | 1 | 9.4/95° C. |
| Example 11 | 95 | 1 | 9.4/95° C. |
| Example 12 | 95 | 1 | 9.4/95° C. |
| Comparative Example 1 | — | — | — |
| Comparative Example 2 | 95 | 1 | 9.4/95° C. |
| Comparative Example 3 | — | — | — |
| Comparative Example 4 | 95 | 1 | 10.3/95° C. |

| Examples and Comparative Examples | Synthesis of particles Hydrothermal reaction step | | | Dehydration treatment | |
|---|---|---|---|---|---|
| | Temp. (° C.) | Time (hr) | pH | Temp. (° C.) | Time (hr) |
| Example 1 | 145 | 5 | 9.8/60° C. | — | — |
| Example 2 | 145 | 5 | 9.8/60° C. | — | — |
| Example 3 | 145 | 5 | 9.8/60° C. | — | — |
| Example 4 | 140 | 4 | 9.6/60° C. | — | — |
| Example 5 | 145 | 5 | 9.6/60° C. | 260 | 2 |
| Example 6 | 140 | 5 | 9.8/60° C. | — | — |
| Example 7 | 135 | 5 | 10.7/60° C. | — | — |
| Example 8 | 145 | 5 | 9.8/60° C. | — | — |
| Example 9 | 145 | 5 | 9.8/60° C. | — | — |
| Example 10 | 145 | 5 | 9.8/60° C. | — | — |
| Example 11 | 145 | 5 | 9.8/60° C. | — | — |
| Example 12 | 145 | 5 | 9.8/60° C. | — | — |
| Comparative Example 1 | — | — | — | — | — |
| Comparative Example 2 | — | — | — | — | — |
| Comparative Example 3 | 140 | 3 | 10.0/60° C. | — | — |
| Comparative Example 4 | 160 | 6 | 10.0/60° C. | — | — |

TABLE 1-continued

| Examples and Comparative Examples | Surface treatment Wet treatment | | | |
|---|---|---|---|---|
| | Treating agent | Amount added (%) | Temp. (° C.) | Time (min) |
| Example 1 | Sodium stearate | 3.8 | 65 | 20 |
| Example 2 | Sodium stearate | 3.8 | 65 | 20 |
| Example 3 | Sodium stearate | 3.8 | 65 | 20 |
| Example 4 | Sodium stearate | 4.3 | 65 | 20 |
| Example 5 | — | — | — | — |
| Example 6 | Sodium stearate | 3.8 | 65 | 20 |
| Example 7 | Sodium stearate | 3.8 | 65 | 20 |
| Example 8 | Sodium stearate | 3.8 | 65 | 20 |
| Example 9 | Sodium stearate | 3.8 | 65 | 20 |
| Example 10 | Lauric acid | 2.5 | 65 | 20 |
| Example 11 | 12-hydroxystearic acid | 3.7 | 65 | 20 |
| Example 12 | Sodium stearate | 3.8 | 65 | 20 |
| Comparative Example 1 | Sodium stearate | 15.2 | 65 | 20 |
| Comparative Example 2 | Sodium stearate | 9.4 | 65 | 20 |
| Comparative Example 3 | Sodium stearate | 4.4 | 65 | 20 |
| Comparative Example 4 | Sodium stearate | 3.3 | 65 | 20 |

| Examples and Comparative Examples | Surface treatment Dry treatment | |
|---|---|---|
| | Treating agent | Amount added (%) |
| Example 1 | Lauric acid | 1 |
| Example 2 | Stearic acid | 1 |
| Example 3 | Lauric acid | 1.5 |
| Example 4 | Lauric acid | 1.8 |
| Example 5 | Stearic acid | 3.5 |
| Example 6 | Lauric acid | 1 |
| Example 7 | Lauric acid | 1 |
| Example 8 | Lauric acid | 1 |
| Example 9 | Lauric acid | 1 |
| Example 10 | Stearic acid | 1 |
| Example 11 | Lauric acid | 1 |
| Example 12 | 12-hydroxystearic acid | 1 |
| Comparative Example 1 | Lauric acid | 1 |
| Comparative Example 2 | Lauric acid | 1 |
| Comparative Example 3 | Lauric acid | 1 |
| Comparative Example 4 | Lauric acid | 1 |

TABLE 2

| Examples and Comparative Examples | Properties of particles | | |
|---|---|---|---|
| | Oil absorption (mL/100 g) | Oil absorption/plate surface diameter | Plate surface diameter (μm) |
| Example 1 | 32 | 160 | 0.200 |
| Example 2 | 31 | 155 | 0.200 |

TABLE 2-continued

| | | | |
|---|---|---|---|
| Example 3 | 28 | 140 | 0.200 |
| Example 4 | 33 | 183 | 0.180 |
| Example 5 | 34 | 170 | 0.200 |
| Example 6 | 32 | 160 | 0.200 |
| Example 7 | 32 | 160 | 0.200 |
| Example 8 | 32 | 160 | 0.200 |
| Example 9 | 32 | 160 | 0.200 |
| Example 10 | 35 | 175 | 0.200 |
| Example 11 | 34 | 170 | 0.200 |
| Example 12 | 34 | 170 | 0.200 |
| Comparative Example 1 | 48 | 1067 | 0.045 |
| Comparative Example 2 | 44 | 677 | 0.070 |
| Comparative Example 3 | 36 | 138 | 0.260 |
| Comparative Example 4 | 39 | 163 | 0.240 |
| Comparative Example 5 | 39 | 195 | 0.200 |
| Comparative Example 6 | 34 | 136 | 0.250 |

| Examples and Comparative Examples | Properties of particles | | |
|---|---|---|---|
| | Thickness ($\mu$m) | Aspect ratio | $\rho_a$ (g/cc) |
| Example 1 | 0.090 | 2.2 | 0.34 |
| Example 2 | 0.090 | 2.2 | 0.32 |
| Example 3 | 0.090 | 2.2 | 0.34 |
| Example 4 | 0.080 | 2.3 | 0.31 |
| Example 5 | 0.080 | 2.5 | 0.32 |
| Example 6 | 0.090 | 2.2 | 0.34 |
| Example 7 | 0.090 | 2.2 | 0.34 |
| Example 8 | 0.090 | 2.2 | 0.34 |
| Example 9 | 0.090 | 2.2 | 0.34 |
| Example 10 | 0.090 | 2.2 | 0.33 |
| Example 11 | 0.090 | 2.2 | 0.32 |
| Example 12 | 0.090 | 2.2 | 0.33 |
| Comparative Example 1 | 0.018 | 2.5 | 0.15 |
| Comparative Example 2 | 0.026 | 2.7 | 0.17 |
| Comparative Example 3 | 0.050 | 5.2 | 0.23 |
| Comparative Example 4 | 0.084 | 2.9 | 0.21 |
| Comparative Example 5 | 0.078 | 2.6 | 0.23 |
| Comparative Example 6 | 0.110 | 2.3 | 0.32 |

| Examples and Comparative Examples | Properties of particles | | |
|---|---|---|---|
| | $\rho_t$ (g/cc) | BET (m$^2$/g) | Mg/Al |
| Example 1 | 0.64 | 11 | 2.4 |
| Example 2 | 0.62 | 11 | 2.4 |
| Example 3 | 0.62 | 11 | 2.4 |
| Example 4 | 0.62 | 14 | 2.4 |
| Example 5 | 0.60 | 11 | 2.4 |
| Example 6 | 0.64 | 11 | 2.7 |
| Example 7 | 0.64 | 11 | 3.0 |
| Example 8 | 0.64 | 11 | 2.1 |
| Example 9 | 0.64 | 11 | 2.4 |
| Example 10 | 0.63 | 11 | 2.4 |
| Example 11 | 0.63 | 11 | 2.4 |
| Example 12 | 0.64 | 11 | 2.4 |
| Comparative Example 1 | 0.29 | 60 | 2.4 |
| Comparative Example 2 | 0.32 | 37 | 2.4 |
| Comparative Example 3 | 0.52 | 15 | 2.4 |
| Comparative Example 4 | 0.49 | 9 | 2.4 |
| Comparative Example 5 | 0.47 | 10 | 2.25 |
| Comparative Example 6 | 0.62 | 10 | 2.25 |

| Examples and Comparative Examples | Kneading with resins (Plasto-mill) | |
|---|---|---|
| | Torque (kg·m) | Dispersibility |
| Example 1 | 0.17 | ○ |
| Example 2 | 0.15 | ○ |
| Example 3 | 0.09 | ○ |
| Example 4 | 0.08 | ○ |
| Example 5 | 0.19 | Δ |
| Example 6 | 0.17 | ○ |
| Example 7 | 0.17 | ○ |
| Example 8 | 0.17 | ○ |
| Example 9 | 0.16 | ○ |
| Example 10 | 0.21 | Δ |
| Example 11 | 0.2 | Δ |
| Example 12 | 0.18 | ○ |
| Comparative Example 1 | 0.3 | X |
| Comparative Example 2 | 0.28 | X |
| Comparative Example 3 | 0.23 | Δ |
| Comparative Example 4 | 0.25 | Δ |
| Comparative Example 5 | 0.26 | Δ |
| Comparative Example 6 | 0.23 | Δ |

| Examples and Comparative Examples | 100 μm-Thick film comprising 40% of heat retaining agent particles | | |
|---|---|---|---|
| | Resin | Haze | Heat retaining property (%) |
| Example 1 | PE | 5.3 | 93.4 |
| Example 2 | PE | 5.4 | 93.3 |
| Example 3 | PE | 5.3 | 93.5 |
| Example 4 | PE | 5.5 | 93.5 |
| Example 5 | PE | 5.6 | 95.4 |
| Example 6 | PE | 4.3 | 94.0 |
| Example 7 | PE | 3.7 | 94.3 |
| Example 8 | PE | 5.9 | 93.0 |
| Example 9 | EVA | 8.6 | 96.8 |
| Example 10 | PE | 5.6 | 93.4 |
| Example 11 | PE | 5.7 | 93.3 |
| Example 12 | PE | 5.3 | 93.3 |
| Comparative Example 1 | PE | 9.8 | 92.9 |
| Comparative Example 2 | PE | 9.5 | 93.0 |
| Comparative Example 3 | PE | 8.7 | 93.3 |
| Comparative Example 4 | PE | 8.8 | 93.2 |
| Comparative Example 5 | PE | 8.5 | 91.1 |
| Comparative Example 6 | PE | 8.8 | 91.5 |

INDUSTRIAL APPLICABILITY

The hydrotalcite-type particles according to the present invention are free from deterioration in transparency even when incorporated in agricultural films and can exhibit a good compatibility with resins and a very high dispersibility. Therefore, the hydrotalcite-type particles according to the present invention can be suitably used as a heat retaining agent for agricultural films.

The invention claimed is:

1. Hydrotalcite particles having an oil absorption of not more than 35 mL/100 g, a tap density $\rho_t$ of not less than 0.55 g/cc, a plate surface diameter of not more than 0.25 μm and a ratio of oil absorption to a plate surface diameter (oil absorption/plate surface diameter) of 140 to 190.

2. The hydrotalcite particles according to claim 1, wherein the hydrotalcite particles are in the form of a compound represented by the following formula (1):

$$M^{2+}_{1-x}Al_x(OH)_2A^{n-}_p \cdot mH_2O \qquad (1)$$

wherein $M^{2+}$ is at least one metal element selected from the group consisting of Mg and Zn; $A^{n-}$ is an n-valent anion wherein n represents a valence of the anion; and x is a number of 0.2 to 0.5 ($0.2 \leq x \leq 0.5$), m is a number of 0 to 1 ($0 \leq m \leq 1$), and p is x/n.

3. The hydrotalcite particles according to claim 1, wherein the hydrotalcite particles have an apparent density $\rho_a$ of not less than 0.25 g/cc.

4. The hydrotalcite particles according to claim 1, wherein the hydrotalcite particles have a BET specific surface area of not more than 30 m²/g and an aspect ratio of not more than 2.5.

5. The hydrotalcite particles according to claim 1, wherein a part or whole of an intercalated water is removed from the hydrotalcite particles.

6. A heat retaining agent for agricultural films comprising the hydrotalcite particles as defined in claim 1.

7. A master batch for agricultural films comprising the heat retaining agent for agricultural films as defined in claim 6, and an olefin-based resin in which the heat retaining agent is incorporated.

8. An agricultural film comprising the heat retaining agent for agricultural films as defined in claim 6.

* * * * *